UNITED STATES PATENT OFFICE.

EDWARD ARTHUR SHAW, OF BUGLAWTON, ENGLAND.

MANUFACTURE OF POTTERY, TILE, &c.

SPECIFICATION forming part of Letters Patent No. 566,420, dated August 25, 1896.

Application filed July 5, 1895. Serial No. 555,061. (No specimens.)

*To all whom it may concern:*

Be it known that I, EDWARD ARTHUR SHAW, a subject of the Queen of Great Britain, residing at Buglawton, in the county of Chester, England, have invented a certain new and useful Improvement in the Manufacture of Pottery, Tile, and Like Ware; and I do hereby declare that the following is a full, clear, and exact description of the invention, which will enable others skilled in the art to which it appertains to make and use the same.

This invention relates to the manufacture of pottery, tile, or like ware, the object being to effect such manufacture and produce the finished ware with but a single firing, thus dispensing with the first or "biscuit" firing, which is generally employed for the purpose of hardening the green ware which is subsequently to be glazed and passed through a second or "glossing" firing.

The invention consists in so treating the green ware without biscuit-firing that it will become sufficiently tough and hard to enable it to be handled, printed, painted, or otherwise decorated, and will also take the requisite glaze in a single firing, and this end is secured by dipping, coating, or partially impregnating the green ware with a solution of soluble glass or like compound, which will serve as a binding material.

I judge by experiment that good results will be obtained by dipping into or coating the green ware with a solution composed of ten parts by measure of water to one part by measure of soluble glass of sixty-six per cent. strength, and then drying said ware. Such drying will be hastened by placing the ware in a room in which the temperature is maintained at about 100° to 200° Fahrenheit, when in an hour or more, depending somewhat upon the article, the ware will be found to be sufficiently hard to be handled, printed, painted, or otherwise decorated, after which the articles may be glazed and fired in the usual way, although an increase of the ordinary temperature will probably hasten vitrefaction.

I do not desire to confine myself to the exact proportions of water and soluble glass stated, although I believe successful results will in all ordinary cases be secured where such proportions are followed.

What I claim is—

1. In the process of manufacturing pottery, forming the green ware and impregnating the green ware with a binding material to toughen and harden the same without biscuit-firing, substantially as described.

2. In the manufacture of glazed pottery, tile and like ware, the process substantially as hereinbefore described consisting in impregnating the green ware with a solution of soluble glass, then drying the ware, then glazing, and firing the same.

3. In the manufacture of glazed pottery, tile and like ware, the process substantially as hereinbefore set forth consisting in impregnating the green ware with a solution of soluble glass, then drying the same, then ornamenting the hardened coated ware, and finally glazing and firing the same.

In testimony whereof I have hereunto set my hand in the presence of two subscribing witnesses.

EDWARD ARTHUR SHAW.

Witnesses:
ALFRED SHERRATT,
CHARLES C. PICKFORD.